United States Patent [19]
Young

[11] 3,774,437
[45] Nov. 27, 1973

[54] RIVET SETTING APPARATUS WITH AXIALLY MOVABLE COLLAR

[76] Inventor: Dale L. Young, 2950 Fox St., Denver, Colo. 80202

[22] Filed: Mar. 2, 1972

[21] Appl. No.: 231,195

[52] U.S. Cl. .............................................. 72/391
[51] Int. Cl. ............................................ B21j 15/26
[58] Field of Search ............................. 72/391, 114

[56] References Cited
UNITED STATES PATENTS

| | | | |
|---|---|---|---|
| 3,423,986 | 1/1969 | Young | 72/391 |
| 3,534,581 | 10/1970 | Mullen | 72/391 |
| 3,144,158 | 8/1964 | Nouvelet | 72/391 |
| 3,504,519 | 4/1970 | Hornung | 72/391 |

Primary Examiner—Charles W. Lanham
Assistant Examiner—Gene P. Crosby
Attorney—Reilly & Lewis

[57] ABSTRACT

In apparatus for setting blind rivets including a mandrel-clamping chuck, a drive screw and split nut sections, there is provided a holding collar arranged around the nut sections and axially movable relative thereto. In a holding position the collar holds the nut sections firmly in an operative engagement with the drive screw without radial deformation under load. The nut sections are initially set by pressing the nut sections toward one another against the drive screw and springs move the collar axially to the nut-holding position once they have been moved together. The collar is inhibited from rearward axial movement and when the nut sections have moved a sufficient distance to set the rivet head and break the mandrel the collar is axially displaced relative to the nut sections to a released position so that it no longer holds the nut sections together and allows springs to spread the nut sections apart and return the nut sections to a forward starting position.

12 Claims, 7 Drawing Figures

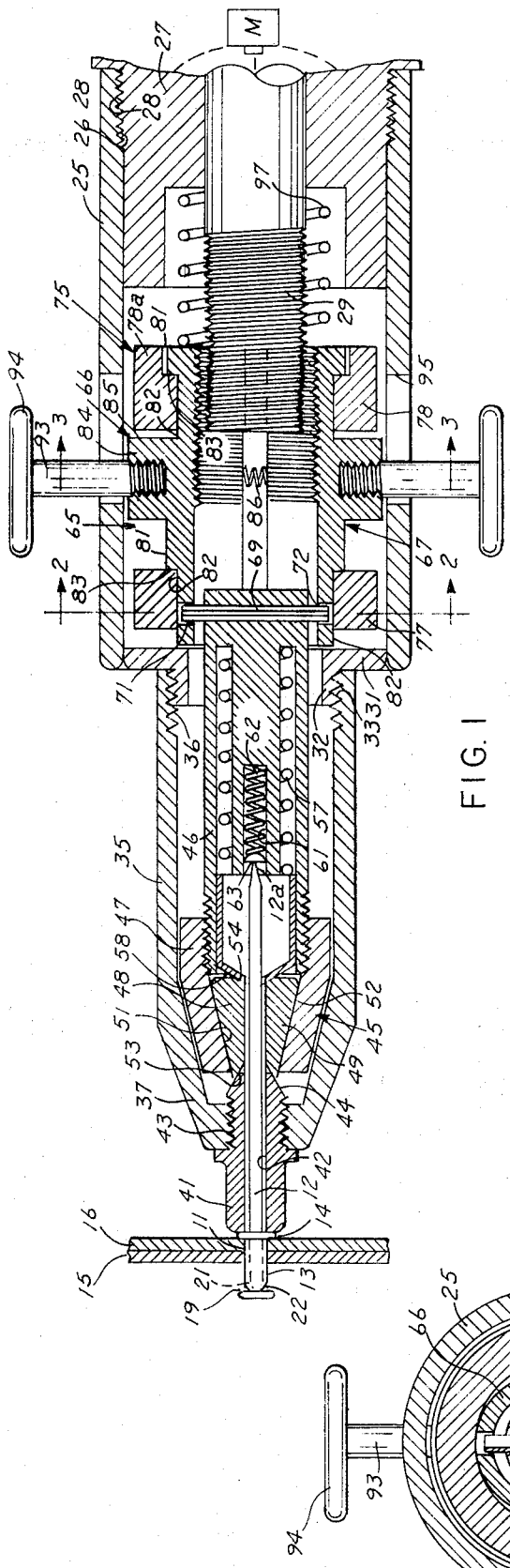
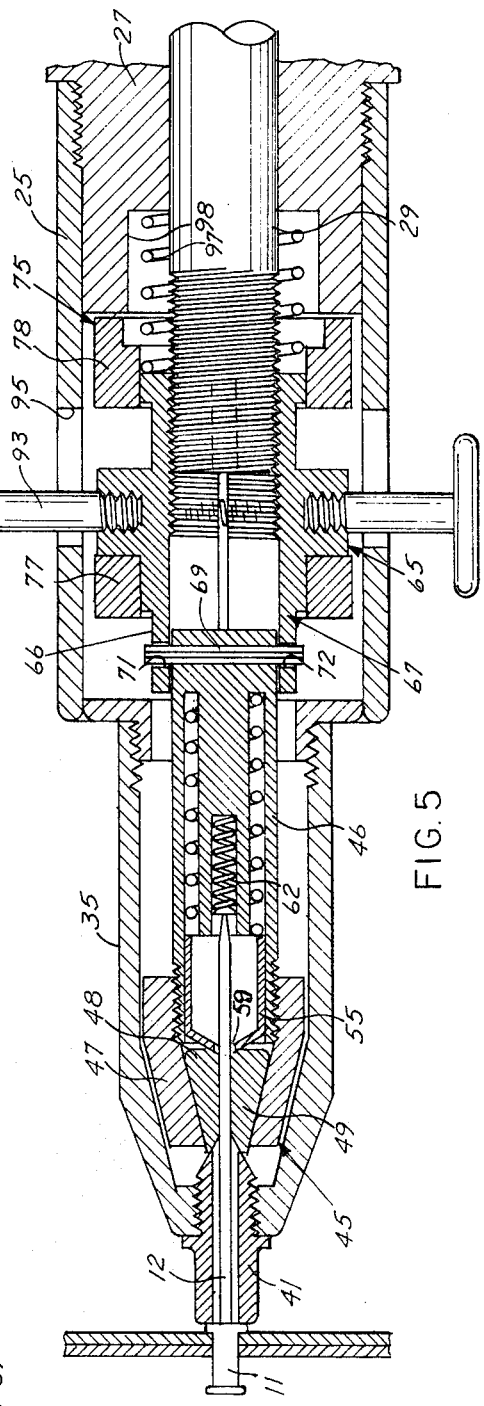
FIG. 1
FIG. 5
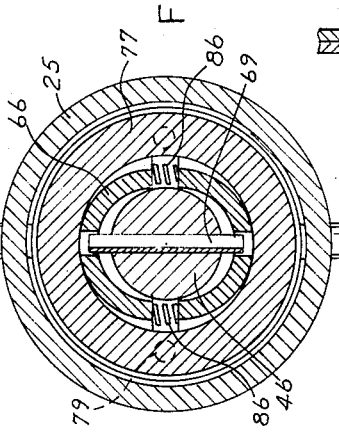
FIG. 2

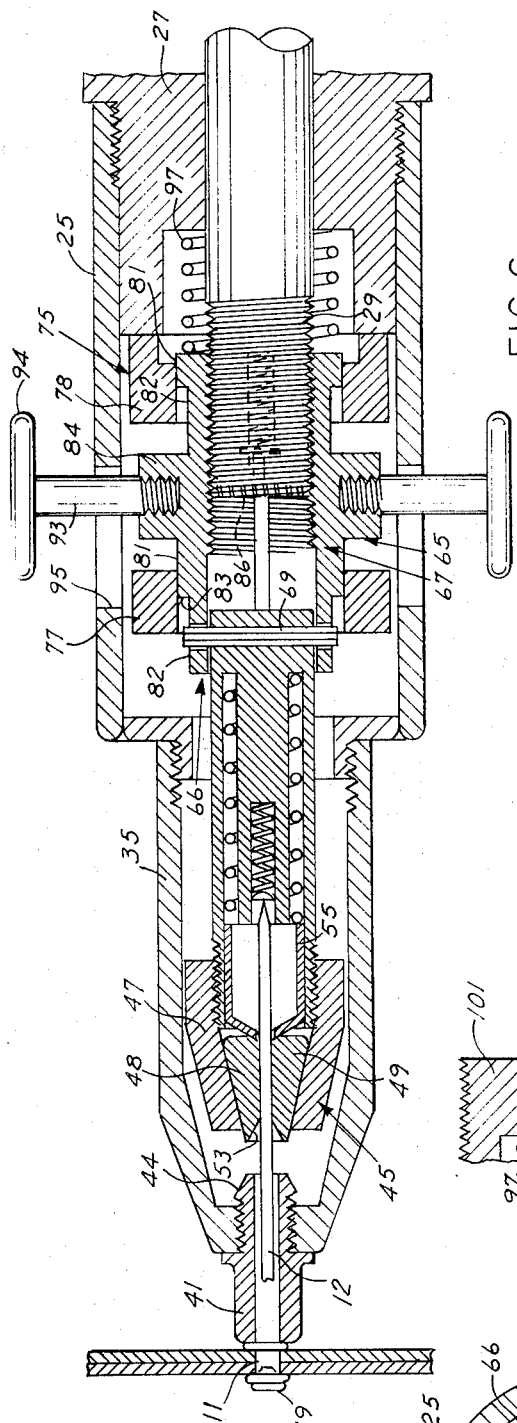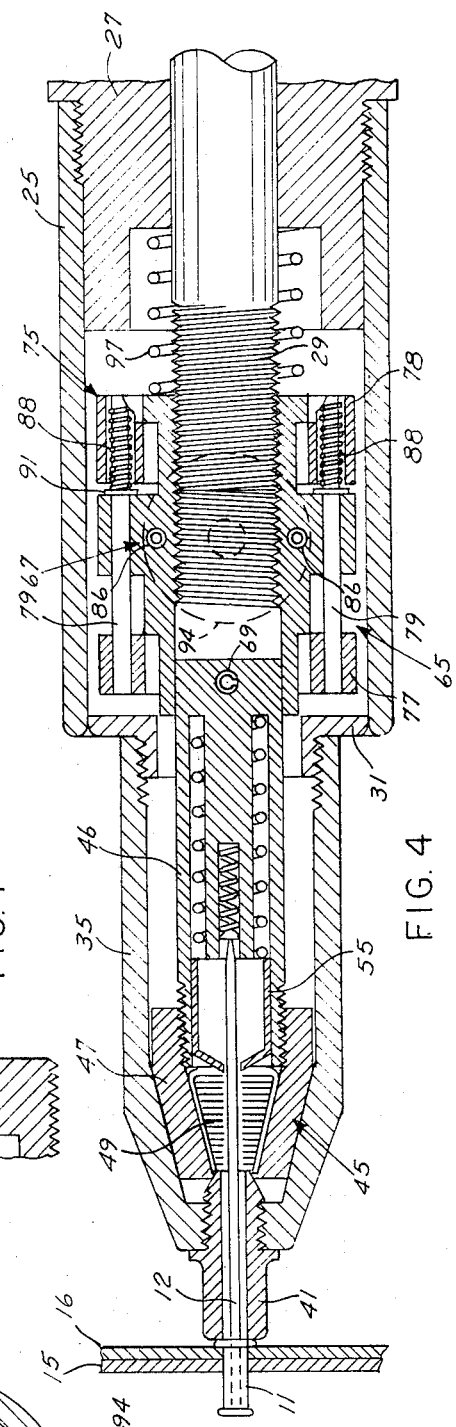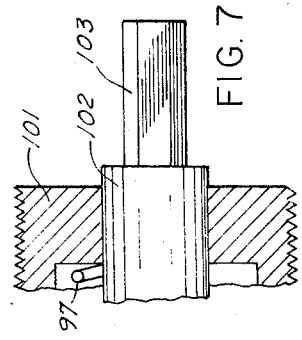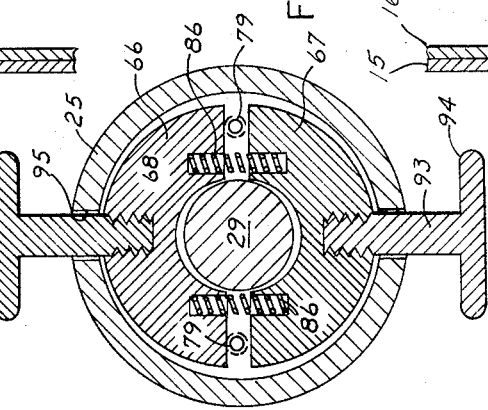

RIVET SETTING APPARATUS WITH AXIALLY MOVABLE COLLAR

This invention relates to improvements in apparatus for setting blind rivets of a variety of sizes and pull requirements and is particularly suitable for being powered by a conventional electric drill motor.

Blind rivets are in common use in the fastening trade. A tool suitable for installing blind rivets exerts a sufficient tension on the mandrel to first set the rivet head and subsequently break the mandrel away from the set head. In the past, blind rivets have been set by air guns which require a compressed air source or have employed specially built motor drives with reversible drive shafts and relatively complex clutch mechanisms.

In my earlier U.S. Pat. No. 3,423,986 there is described rivet setting apparatus utilizing a split nut sections coupled between a chuck and a motor driven screw, the nut sections being held in operative engagement with the screw for rearward movement to exert tension on a rivet mandrel carried by the chuck, the release of the nut being controlled by the release of an external latch after the chuck has traveled a rearwardly sufficient distance to break at the mandrel neck, the chuck being returned to the starting position by a compression spring. In U.S. Pat. No. 3,534,581 an internal cam-latch arrangement is utilized having a pair of internal axially extending elongated pins to releasably hold the split nut sections together in engagement with the screw, the pins being axially displaced relative to the nut sections to a release position after the nut section have traveled rearwardly a sufficient distance to break the rivet mandrel.

In the use of the split nut type clutch it is important that the nut sections be held firmly against the drive screw under load, without possible radial deformation particularly when heavy duty rivets are being set, such as for example, quarter inch steel rivets.

Accordingly, the element for locking the nut sections in place against the drive screw cannot bend or deform radially under heavier pull requirements as such would obviously result in a malfunctioning of the device. Moreover, from the standpoint of a cost of manufacture, it is important that the parts be made from other than for forging, milling or stamping techniques and preferably on high speed automatic screw machines.

Accordingly, it is an object of this invention to provide a novel and improved rivet setting apparatus for rivets characterized by its simplicity of construction, durability, relative low cost of manufacture and its ability to set rivets having greater than average pull requirements such as quarter inch steel rivets.

Another object of the present invention is to provide an improved rivet setting apparatus for blind rivets and the like wherein split nut sections are positively held against a screw drive in a highly reliable manner without chance of deformation under heavy-duty rivet setting applications and at the same time may be manufactured using the less expensive automatic screw machines or the like.

Still a further object of this invention is to provide a novel and improved blind rivet setting apparatus characterized by an axially movable locking ring assembly surrounding both end portions of the split nut clutch sections to hold them firmly in place against the drive screw as the chuck is being moved rearwardly in response to the rotation of the drive screw.

In accordance with the present invention in a preferred form shown there is provided a mandrel clamping chuck, drive screw, an outer housing, split nut sections having a particular external size with external portions reduced in size and a holding collar. This collar is comprised of a pair of axially spaced rings arranged around the nut sections in a holding position to hold the nut without radial deformation under load in engagement with the drive screw so that rotation of the screw will move the nut sections and chuck rearwardly to set the rivet head and break the mandrel, the collar rings are disposed around the portions of reduced size so that the collar no longer holds them and allows springs to spread the nut sections apart and return the nut sections to the forward starting position.

Other objects, advantages and capabilities of the present invention will become more apparent as the description proceeds taken in conjunction with the accompanying drawings in which:

FIG. 1 is a longitudinal sectional view of the rivet setting apparatus, showing the parts in the full forward position with the chuck jaws spread apart to receive the rivet mandrel and with the nut sections in an expanded position disengaged from the drive screw.

FIG. 2 is a transverse cross-sectional view through the expandable connection between the chuck and the split nut section taken along line 2—2 of FIG. 1.

FIG. 3 is a transverse cross-sectional view taken through the nut sections along the push rods along lines 3—3 of FIG. 1.

FIG. 4 is a longitudinal sectional view taken at right angles to that of FIG. 1.

FIG. 5 is a longitudinal sectional view of the rivet setting apparatus of FIG. 1 wherein the chuck and nut sections have been moved rearwardly a sufficient distance to cause the rivet mandrel to be gripped tightly between the chuck jaws. FIG. 6 is a longitudinal sectional view of the rivet setting apparatus of FIG. 1 wherein the chuck and nut sections have been moved rearwardly a sufficient distance to break the mandrel and the locking collar is held against further rearward movement at the rear of the housing as the nut sections continue to move rearwardly.

FIG. 7 shows an alternative arrangement for making the apparatus suitable for use with the chuck of an electric drill.

Referring now to the drawings, a conventional pull-type blind rivet is shown which comprises a tubular rivet head 11 and a setting mandrel 12 having an end portion telescopically received in the tubular rivet head 11. Blind rivets come in a variety of shapes, sizes and materials to meet different fastening requirements. The tubular rivet head 11 has a shank 13 and a radially enlarged flange 14, the shank being sized to insert into a hole in a workpiece represented as a pair or work sheets 15 and 16 placed one against the other with holes therein in alignment. The mandrel 12 has a radially enlarged head 19 at one end and a weakened neck section 21 adjacent the mandrel head 19, and a sharp point 12a at the opposite end. The end of the tubular rivet head 11 opposite its flange 14 is radially inturned at 22 into the neck to prevent movement of the head 11 along the mandrel 12. The side of the work from which the rivet is applied is the "free" side and the other side is the "blind" side. In installing the rivet, the mandrel head 19 and rivet shank 13 insert into the aligned holes of the workpiece from the free side with the flange 14 abutting against the free side. Generally, the rivet is set by pulling the mandrel 12 toward the free side and the mandrel head 19 first upsets or radially expands the end of the tubular rivet head 11 at the blind side of the work to secure the work pieces together 6 and further tension on the mandrel causes it to break at the neck section 21 whereby the rivet setting operation is completed as will be described more fully hereinafter in conjunction with the apparatus to be described for setting the rivet.

The apparatus shown for setting blind rivets of the type above-described includes an outer, elongated tubular housing made in two parts for the convenience of manufacture and convenience of assembly and disassembly which includes a main sleeve 25 and a front sleeve 32 of lesser diameter than the main sleeve. The main sleeve 25 of circular transverse cross-section has internal threads 26 at the rear end is adapted to thread over a support body 27 having external threads 28, the support body 27 surrounding an externally threaded drive screw 29. In the form shown in FIGS. 1-6, the support body is made as an integral part of the housing of an electric motor represented at M and the drive screw 29 is an extension of or coupled to the drive shaft of the motor M. In this form then, the rivet setting apparatus is in the form of an attachement to the end of the motor and is conveniently installed by threading the main sleeve 25 over the end of the support body 27. A hollow end cap 31 is supported in the forward end of the main sleeve 25 and has a forwardly projecting flange portion 32 with external threads 33. The front sleeve 35 is of circular transverse cross-section and has internal threads 36 at the rear end which thread over the flange threads 33 to releasably secure the main sleeve and smaller front sleeve 32 together. The front sleeve 32 has a forwardly converging or tapered nose portion 37 at its forward end with a reduced, internally threaded central bore.

A removable nosepiece 41 is received in end of bore 38 and has an internal bore 42 sized to receive the mandrel 12 of the rivet. Nosepiece 41 has external threads 43 threaded into the nose portion 37 to where a flange portion thereof abuts the front end of the front sleeve 35. The nosepiece 41 is interchangable with nosepieces having other internal bores, the particular size of the nosepieces depending on the diameter of the rivet mandrel being installed. The rear end of the nosepiece is rearwardly tapered at 44 to provide rearwardly convergent, beveled cam surfaces.

The clamping means for gripping the rivet mandrel is a chuck 45 axially aligned within and slidable relative to the housing. The chuck 45 is conventional and may take a variety of forms but the one shown for purposes of illustration includes slide member 46 in the form of a rod having a circular transverse cross-section and provided with external threads on the front end and an enlarged hollow tapered head 47 with internal threads which thread over the external threads on the slide member 46. A pair of oppositely disposed gripping jaw sections 48 and 49 are carried in head 47. The enlarged head 47 has an internal bore with forwardly convergent front bore section or tapered inner surface 51 forwardly of the internal threads which is engaged by the external forwardly tapered outer surfaces 52 of the jaws when the jaws all urged forwardly into the head causing them to be moved axially inwardly into a gripping relation to the rivet mandrel. The forward ends of the jaws are beveled at 53 to form rearwardly divergent cam surfaces and the rear ends of the jaws are beveled at 54 to form rearwardly convergent cam surfaces. Each of the jaws have a central semicircular shaped bore section to receive the rivet mandrel.

A hollow plunger 55 is axially aligned and slidably movable in a larger bore of the slide member 46, the plunger being resiliently urged forwardly by a compression spring 57. The plunger 55 has a forwardly converging or forwardly tapered nose portion 58 providing beveled camming surfaces which are moved by the spring 57 forwardly against the rear beveled edges 53 of the jaws. The plunger has a front opening 59 aligned with the base of the jaws and to receive the rivet mandrel 12.

In the full forward position for the chuck shown in FIGS. 1 and 4, the forward beveled edges 53 of the jaws are all urged, against the beveled edges 44 on the rear end of the nosepiece and the forward beveled edges 58 of the plunger 55 are urged against the rear beveled edges 58 of the jaws to spread the jaws apart and form a gap along the bore sections through which the rivet mandrel will slide freely.

The slide member 46 also has a smaller central axial bore 61 rearwardly of the plunger 55 which extends only about one half of the remaining length thereof. The smaller bore 61 contains a compression spring 62 and a concavo-convex shaped support cap 63. Upon the insertion of the rivet mandrel into the chuck via the nosepiece, jaws and plunger the inner pointed end of the mandrel presses against the cap 63 to place the spring 62 under compression as shown. This spring and cap assembly are used to eject the mandrel from the chuck and nosepiece when the chuck is returned to the forward position after the rivet has been set and the mandrel broken.

The chuck 45 is first moved rearwardly forwardly by the forces of the rotatably driven screw 29 powered by a suitable drive motor M preferably a conventional fractional horsepower electric drill motor or the like. A split-nut or half-nut type clutch represented by numeral 65 is arranged to alternately engage the drive screw 29 to couple the drive screw to the chuck 45 and after a preselected amount of rearward travel for the chuck and release to decouple the drive screw 29 from the chuck. The clutch includes a nut divided diametrically into a pair of nut sections, 66 and 67, the transverse cross-section of the nut being preferably generally circular in shape and the nut has a threaded bore 68 so that each nut section has a generally semicircular inner bore section. The nut sections are connected to a rear end portion fo the slide member 46 by having the forward end portions of each nut section disposed over the rear end of the slide member with a rolled split pin 69 mounted in the rear end of the slide member with end portions thereof extending through apertures 71 and 72 in the nut sections. The apertures 71 and 72 being sized relative to the pin, so that the nut sections are free to expand and contract radially relative to said slide member to allow the nut sections to alternately disengage from and engage with the drive screw 29. In FIG. 1 the nut sections are shown in the expanded position disengaged from the drive screw.

A position control for the nut sections 66 and 67 includes an outer locking ring or collar 75 which in one position relative to the nut sections firmly holds the end portions of the nut sections 66 and 67 in engagement with the threads of the screw 29 and in another position relative to the nut sections allows them to expand and become disengaged from the drive screw 29. The locking ring or collar 75 comprises two of axially spaced front and rear rings or annular members 77 and 78, respectively, supported by a preselected fixed distance from one another by a pair of oppositely disposed connecting rods 79. The internal bore of the rings 77 and 78 is the same and is sized to slide freely around a pair of axially spaced external portions 81 of the nut sections having a preselected intermediate outer diameter sized so that the rings will confine or hold the nut sections together so that they operably thread over the drive screw 27 without radial expansion or radial deformation of the nut section while the tension is being applied to the rivet mandrel.

The nut sections are further provided with a second pair of additional axially spaced external portions 82 of a reduced size or smaller outer diameter than portions 81 located directly forwardly of portions 81 to form a pair of radially extending shoulders 83, the reduced portions 82 being surrounded by the rings 77 and 78 when the collar assembly is moved to a forward position relative to the nut where the nut sections are free to expand radially and become disengaged from the screw as shown in FIG. 1. The nut sections also have an intermediate portion 84 having a maximum outer diameter and form a pair of shoulders 85 adjacent portions 81. A pair of compression springs 86 are mounted in opposed sockets opeining through the side edges of the nut screw sections on opposite sides of thereof. The springs 86 resiliently urge the nut sections 66 and 67 apart to the expanded position when the rings are surround the associated reduced portions 82.

To urge the collar assembly to the contracted nut holding position on the nut sections, a pair of compression springs 88 are mounted on the connecting rods 79 and fit in axially extending sockets 89 in the rear rings 78 and against a washer 91 abutting shoulder 85 on each nut section. Prior to a manual setting of the nut sections together in the contracted operating position, the nut sections are held apart and the collar is held against rearward movement relative to the nut sections by the engagement of the shoulders 83 of the nut sections with a rear end portion of each ring as best seen in FIG. 1.

Push rods 93 with outer buttons 94 extend through elongated slots 95 in the housing and thread into the intermediate portion 84 of each nut section. The nut sections are moved toward one another by depressing buttons 94 and as soon as this occurs the inner surfaces of the rings 77 and 78 clear the associated shoulders 83 on the nut and simultaneously the springs 88 act to move the entire collar assembly 75 rearwardly to a rear position relative to the nut sections and against portions 81 to hold them in a nut holding position against the drive screw 29 as shown in FIG. 5. A rear compression spring 97 is disposed in a recessed area 98 in the support body 27 and against the rear ends of the nut sections to move the nut sections and chuck forwardly to the full forward portion of FIGS. 1 and 4 when the nut sections expand to release from the drive screw. 29.

In a full sequence of operation for the above described rivet setting apparatus it is assumed that the drive screw 29 is being rotated by the motor M which has been brought about by energizing the motor. The rivet mandrel 12 is inserted into the chuck (FIG. 1 and 5) and compresses spring 62. The push buttons 94 are pressed inwardly and the collar assembly 75 is urged rearwardly to contract the nut sections 66 and 67 position them into engagement with the screw 29 so that the nut begins to thread on the drive screw and the chuck moves rearwardly. As soon as the chuck jaws 48 and 49 move rearwardly a slight increment of travel they are free from rear beveled edges 44 of the nosepiece. The compression spring 57 then moves the chuck jaws forwardly against the inner tapered surfaces of the head 49 so that they now grip tightly against the mandrel as shown in FIG. 5. Further rearward movement of chuck 45 and nut sections 65 applies a tension to the mandrel which ultimately breaks along the weakened neck 21. After a slight amount of rearward travel of the nut sections, a rear outer extension 78a of the locking ring 78 comes into engagement with the forward end of the body 27 which acts as a stop or abutment and causes the rings assembly 75 to stop so that only the nut sections 77 and 78 and chuck 45 continue to move rearwardly as the nut threads on the screw to break the mandrel as shown in FIG. 6 and this rearward movement continues until the inner rear end portions of the rings 77 and 78 move past the associated shoulders 83 on the nut at which time the nut sections 77 and 78 are released and are expanded outwardly by the compression springs 86 so that the nut sections are no longer in operably engagement with the screw. As soon as the nut sections are free from the drive screw the rear compression spring 97 urges the chuck, nut sections, and collar to the forward starting position of FIGS. 1 through 4, where the forward ends of the jaws again come into contact with the rear end of the nosepiece and the plunger with the rear of the jaws to spread them apart so that the compression spring 62 now ejects the broken mandrel. The chuck is now open and ready to receive the next rivet mandrel. The next rivet mandrel is inserted into the nosepiece and the head of the mandrel into the workpiece, the push buttons 94 depressed and above sequence is repeated.

Referring now to FIG. 7, an alternative arrangement shown making the apparatus suitable for use with the conventional electric drill chuck includes a support body 101 with external threads to thread into housing 25 and having a shaft 102 journaled thereon, the shaft terminating in a shank extension 103 adapted to be received in the chuck of a conventional electric drill.

From the foregoing it is apparent that the two ring collar embracing the forward and rear ends of the nut sections will permit no deformation of the nut sections during the pulling action. The circular collar and nut sections with outer steps may be easily and economically made using automatic screw machine techniques.

Although the present invention has been described with a certain degree of particularity, it is understood that the present disclosure has been made by way of example and that changes in details of structure may be made without departing from the spirt thereof.

What is claimed is:

1. In rivet setting apparatus for setting a rivet having a mandrel, the combination comprising:
    an elongated tubular housing having a nosepiece at the forward end thereof for slidably receiving a mandrel therein,
    a chuck mounted in said housing for movement along the axis thereof, and operable to grip a portion of the rivet mandrel projecting thereinto and, power actuated means operable to move said chuck first rearwardly and then forwardly, between forward and rearward limits, said power actuated means comprising a nut attached to said chuck within said housing and having an external portion reduced in size and a threaded bore, a rotatably driven screw mounted in said housing and operably engaged in the bore of said nut, said nut being disengageable from said screw, manually operable position control means for said nut including a collar slidable over the nut disposed in one position relative to said nut for engaging said nut operably on said screw whereby to initiate rearward movement of said nut and chuck and disposed in another position relative to said nut around said external portion reduced in size to release the nut sections for disengagement from the screw when the chuck has been moved rearwardly a predetermined distance, means operable against said collar to release said nut from said screw when said chuck has been moved rearwardly a predetermined distance, and resilient means operable to urge said nut forwardly in said housing whenever the nut is disengaged from said screw.

2. In rivet setting apparatus as set forth in claim 1 wherein said nut comprises a pair of split nut sections having a pair of axially spaced external portions reduced in size and a pair of axially spaced external portions of greater size adjacent said reduced portions, said collar including a pair of rings axially spaced from one another adapted to surround said portions of greater size in said one nut engaging position and surround said portions of reduced size in the other disengaging position.

3. In rivet setting apparatus as set forth in claim 2 including rod means extending radially outwardly from said nut sections through elongated slots in said housing and terminating in push buttons for manually moving said nut toward one another against the screw.

4. In rivet setting apparatus as set forth in claim 3 including means to urge the collar rearwardly relative to the nut sections to the nut engaging position as soon as the nut sections are moved inwardly against the screw.

5. In rivet setting apparatus as set forth in claim 2 including stop means to inhibit the rearward movement of the collar with the nut sections as the nut sections thread on the screw whereby after the nut sections move a preselected distance the collar no longer holds the nut section against the screw.

6. In rivet setting apparatus as set forth in claim 2 including means disposed between said nut sections to urge them apart and away from the screw.

7. In rivet setting apparatus as set forth in claim 1 wherein said tubular housing is adapted to be releasably secured to drive motor housing.

8. In rivet setting apparatus for a rivet having a mandrel in combination:
a tubular housing,
means within the housing for clamping and pulling a rivet mandrel and including a pair of nut sections,
a drive screw rotatably supported within the housing and adapted for engagement by the nut sections,
and position control means for the nut sections for sequential engagement and disengagement of the nut sections, said position control means including collar means extending completely around the nut sections and having an internal contour complementary with the external contour of the nut sections when the nut sections are in operative engagement with the drive screw, said collar means being movable endwise within the housing and slidable around the nut sections in a close fitting relation to effect an operative engagement of the screw by the nut sections without significant radial expansion of the nut sections and thereby initiate pulling of the mandrel.

9. In rivet setting apparatus for setting a rivet having a mandrel the combination comprising:
an elongated tubular housing having a tubular nosepiece at the forward end thereof for slidably receiving a mandrel therein, thereby said mandrel extends into said housing,
a chuck mounted in said housing for a movement parallel to the axis thereof, and operable to grip that portion of the rivet mandrel projecting thereinto and,
a drive screw adapted to be driven by an electric motor,
a pair of split nut sections coupled to the rear of said chuck and arranged to expand radially in relation thereto, said nut sections having a pair of axially spaced first external portions of one size and a pair of axially spaced second external portions of reduced size forwardly of said first external portions to form a pair of radially extending shoulders,
a collar surrounding said nut sections including a pair of rings supported, a fixed distance apart, by a pair of axially extending rods, said rings being arranged to be around said first nut portions in one position and said second nut portions in another position,
compression springs on said rods held under compression when said nut sections are expanded,
a push rod extending outwardly from each nut section through an elongated slot in the housing and terminating in a flat push button, said push bottons being manually pushed toward one another to urge the nut sections against the drive screw whereby said compression springs urge the collar rings to the one position around said first nut portions and the nut sections move rearwardly as they thread on the driven screw,
stop means rearwardly of the collar to inhibit the rearward movement of the collar with the nut sections as they thread on the screw whereby after the nut sections are moved a sufficient distance to set the rivet head and break the mandrel the collar rings are positioned around said sectional nut portions of reduced size and the nut sections are released,
spring means to expand the nut sections radially outwardly upon release by said collar to disengaged position,
spring means to urge the nut sections to the forward starting position when they are expanded to the disengaged position.

10. In rivet setting apparatus as set forth in claim 9 wherein said stop means is in the form of a body disposed in the rear end of said housing, the rear ring of said collar having a rear extension adapted to engage said body.

11. In rivet setting apparatus as set forth in claim 9 wherein said collar and nut have a circular transverse cross-section.

12. In rivet setting apparatus as set forth in claim 10 wherein said collar rings are continuous throughout the circumferential extent.

* * * * *